D. C. MILLER.
SIGNALING DEVICE.
APPLICATION FILED APR. 7, 1921.
1,396,136.
Patented Nov. 8, 1921.
2 SHEETS—SHEET 1.
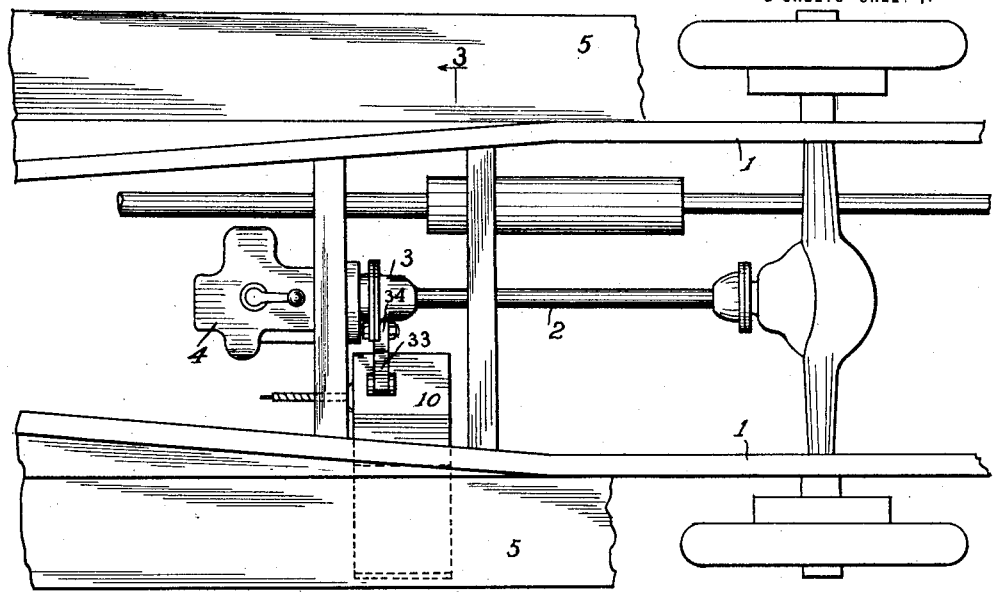
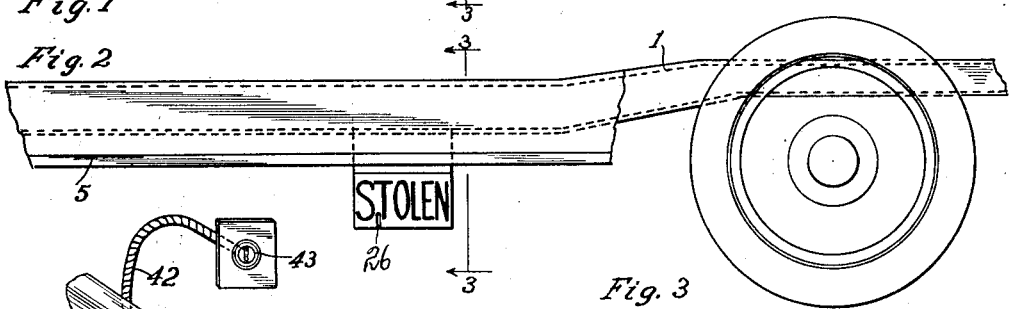
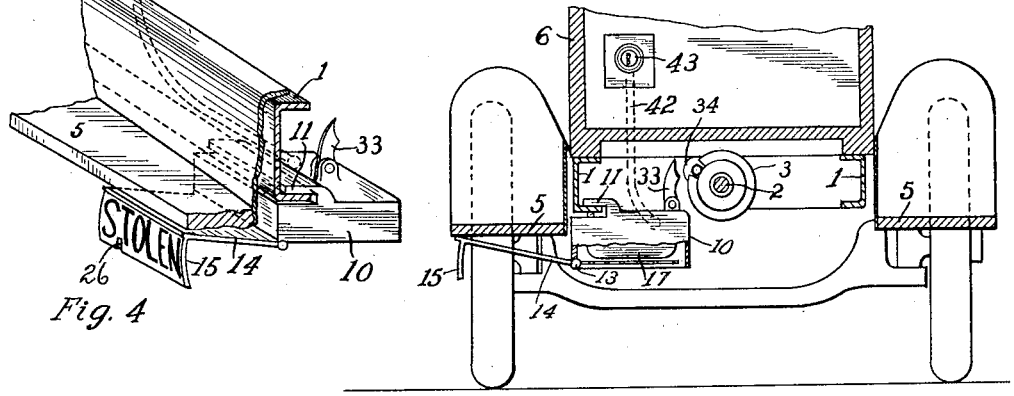
Inventor
Donald C. Miller
By Harold Elias Smith Atty.

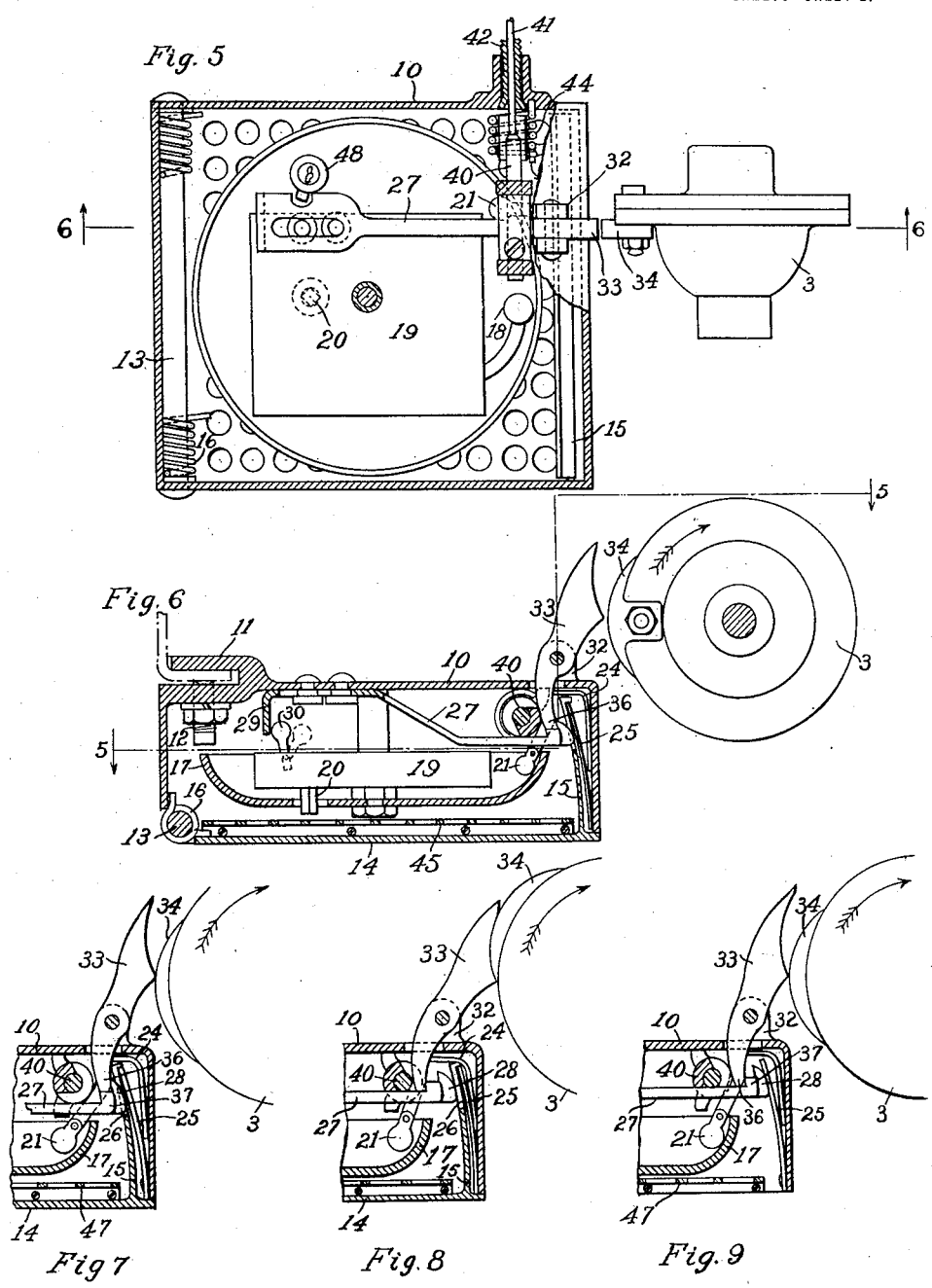

UNITED STATES PATENT OFFICE.

DONALD C. MILLER, OF CLEVELAND, OHIO.

SIGNALING DEVICE.

1,396,136.  Specification of Letters Patent.  Patented Nov. 8, 1921.

Application filed April 7, 1921. Serial No. 459,367.

*To all whom it may concern:*

Be it known that I, DONALD C. MILLER, a citizen of the United States, residing at Cleveland, in the county of Cuyahoga and State of Ohio, have invented a certain new and useful Improvement in Signaling Devices, of which the following is a full, clear, and exact description, reference being had to the accompanying drawings.

This invention relates to signaling devices and has special reference to a device for indicating the theft or unauthorized operation of an automobile or other vehicle. The objects of the invention are the provision of a device which shall afford both an audible and a visible signal, the visible signal for the purpose of announcing to police officers and other persons the identity of the car which is being removed, and the audible signal being for the double purpose of calling the attention of others to the visible signal and also of frightening the thief from his intended work. Other objects of the invention are the provision of simple and compact mechanism for effecting these objects; the provision of a standard mechanism which is applicable to substantially all makes of cars, which can be installed with a minimum of expense and labor, which is effectively shielded from being tampered with by the intending thief but which can readily be rendered inoperative by the owner or authorized operator; the provision of a device of this character which shall be started by the motion of the car and afterward operated automatically; while further objects and advantages of the invention will become apparent as the description proceeds.

In the drawings accompanying and forming a part of this application I have illustrated one embodiment of my said invention, although it will be understood that the structure here shown constitutes only one out of numerous physical forms in which my inventive idea can be embodied. In these drawings Figure 1 is a plan view of part of an automobile chassis provided with my improvements; Fig. 2 is a side elevation of the device shown in Fig. 1 showing the visual portion of my signaling device in exposed position; Fig. 3 is a cross sectional view corresponding to the lines 3—3 of Figs. 1 and 2 and also showing a part of the automobile body in place; Fig. 4 is a perspective view of my improved signaling device together with adjacent parts of the car; Fig. 5 is a top plan view of the mechanism corresponding to the broken line 5—5 of Fig. 6; Fig. 6 is a sectional view corresponding to the line 6—6 of Fig. 5; and Figs. 7, 8, and 9 illustrate different steps in the operation of the mechanism.

Describing by reference characters the parts shown in the drawings, 1—1 represent the frame members of an automobile chassis, which ordinarily consist of steel channel members having inwardly projecting top and bottom flanges, 2 represents the propeller shaft and 3 the universal joint therein which is generally located approximately mid-way of the car and immediately in the rear of the gear-set box 4. 5—5 represent the two running boards of the car and 6 represents the car body.

My improved signaling mechanism, in the form here illustrated, includes a rectangular casing 10 having at its upper side an attaching flange 11 adapted to overhang the lower flange of the frame member 1 and to be securely clamped thereto by a suitable set screw 12 inside the casing (see Fig. 6). In this way the casing is supported in horizontal position with its inner side projecting rather close to the universal joint 3 and its lower edge projecting slightly below the level of the running board. Pivoted to the lower part of this casing upon a horizontal hinge member 13 is a closing plate 14 having at its free edge an annunciator portion 15 upon which is inscribed in large characters the word "Stolen" or other suitable legend (according to the language of the country or fancy of the user) indicating the misappropriation of the vehicle. When the lid is folded across the face of the casing in its inoperative position this portion 15 preferably falls inside one of the walls thereof and is caught there by any suitable means having the operating characteristics hereafter described, while a suitable spring 16 serves upon the release of such catch to swing the lid into the exposed position shown in Figs. 1, 2, 3, and 4. Also located inside the casing is a bell or gong 17, (or other noise producing device) here shown as having two independent operating means, the one a hammer 18 operated by a spring mechanism 19 which can be wound by the key shaft 20, and the other a hammer 21 adapted to be actuated directly by the motion of the propeller shaft, both of such hammers being locked and unlocked by the same contrivance so that the authorized operator of the vehicle can control the operation of the signal.

The mechanism for controlling and operating the signal here illustrated is as follows: The edge of the portion 15 is formed with an out turned lip 24 and the inner face of the casing wall is provided with a spring latch 25 adapted to engage said lip and hold the plate 14 against the tension of the spring 16. The portion 15 is also formed with a notch 26 traversing this lip. Suitably secured to the bottom face of the top wall of the casing is a slide 27 having a rounded end 28 adapted to be projected through said notch and to release the slide 25. The opposite end of this latch is formed with a downturned tip 29 adapted to engage a suitable detent 30 carried by the spring mechanism 19 and start the operation of the hammer 18. Pivoted upon a suitable bracket 32 carried by the casing is a finger 33 which projects close to some moving part of the automobile, in the present instance the universal joint 3, which is here provided with an attached wiper 34 adapted to engage and oscillate said finger. The opposite end of said finger projects inside the casing where it is provided with the hammer 21 and also with a tip 36 adapted to coöperate with an upturned hook 37 formed on the slide 27. I have also shown a second hook 38 outside of the hook 37. This slide is not only longitudinally movable but is also vertically flexible, and located in the angle between this latch and the tip 36 is a locking member 40. This member has a wedging portion adapted when moved into "off" position to both press downwardly upon the slide 27 and laterally upon the tip 36 (as shown in Fig. 6) so as to hold the finger away from the wiper and also to hold the slide against reciprocation. In this relation the tip 36 is shown as resting upon the top of the hook 37, and on account of the deflection of the slide it is impossible for it to displace the catch 25. Upon the movement of the member 40 to "on" position as shown in Fig. 7 the following steps occur: the finger 33 becomes free to move laterally, and does so either immediately (in case the wiper 34 be in a position to permit the same), or as soon thereafter as the wiper is displaced; as soon as the finger has moved the slide 27 springs upwardly so as to bring the hook 37 behind the tip 36. This however has no effect upon the operation of the mechanism, and if the member 40 be merely restored to its former position the mechanism is held quiet. However, if it be attempted to drive or tow the car away, the very first revolution of the member 3 will displace the finger outwardly, thereby drawing the slide 27 lengthwise which simultaneously unlocks the catch 25, trips the detent 30 so as to actuate the spring mechanism, and brings the hammer 21 forcibly in contact with the gong. The visual annunciator instantly flies to open position and the bell continues to ring, under the influence of the hammer 21 as long as the car is driven, and also independently thereof under the operation of the mechanism 19 until the latter runs down or is shut off.

The member 40 can be operated either by a movement of reciprocation or a movement of rotation. In these views I have shown a rotary device having a cam portion for effecting the locking, the same being connected by means of the flexible shaft 41 housed in the flexible tube 42 to a key cylinder 43 suitably located inside the body of the car; and in order to prevent the same from being rendered inoperative by cutting or tampering I have shown a spring 44 inside the casing 10 adapted upon any such violation to move the member immediately to releasing position. In order to prevent access to the operating mechanism when the plate 14 has been displaced whereby the gong might be silenced I have shown a fixed cover 45 located immediately inside the plate 14, such cover being here shown as of perforated construction in order that the sound may not be impeded. In case the intending thief attempts to render the device inoperative by tying back the finger 33 before starting he will by this act displace the slide by the engagement of the tip 36 with either the hook 37 or the hook 38, depending upon the initial position of that finger.

I have also shown a key operated member 48 associated with the slide 27 so that the owner or operator can restore the slide to its initial position after the mechanism has once been sprung and also to enable the mechanism to be tested and adjusted.

It will be clear from the foregoing that upon the releasing of the member 40, no immediate operation of the mechanism can possibly occur, but that such operation will be commenced upon the making of one turn of the propeller shaft, after which the hammer 21 will strike the bell once for each turn, which corresponds to a movement of the car of less than one foot. I do not confine myself to this particular location for the mechanism, since some users will undoubtedly prefer to have the same located at the rear of the car and it is even possible to exhibit the visual signal simultaneously in a plurality of different places about the machine. Also I do not restrict myself to an actuation of the signaling mechanism by the propeller shaft or universal joint, since this can equally well be effected by connection to one of the brake drums, or wheel hubs, or to the speedometer shaft, or to any other moving part of the machine. Neither do I restrict myself to any of the features of construction, arrangement or design herein set forth except as the same are specifically recited in my claims. For example instead of employing two independent mechanisms to sound the gong, only one may be used; the continuously operating mechanism need not consist of a spring motor but might equally well consist of electrical mechanism actuated by the usual starting battery; the audible signal may consist of devices other than gongs, such for example as a suitable whistle, the visual signal may be otherwise constructed and mounted; and a great many changes can be made in constructional details.

Having thus described my invention what I claim is:

1. The combination with a vehicle of a signaling device comprising a visual annunciator and an audible annunciator, said visual annunciator having a legend indicating that the vehicle is being improperly moved, and means operative upon the movement of said vehicle for starting both annunciators.

2. The combination with a vehicle of a signaling device comprising a visual annunciator and an audible annunciator, said visual annunciator having a legend indicating that the vehicle is being improperly moved, means operative upon the movement of said vehicle for starting both annunciators, and means under the control of the authorized operator for rendering such device either operative or inoperative at will.

3. The combination with a vehicle of a visual annunciator having thereon a legend indicating that said vehicle is being stolen or moved without authority, an audible annunciator adapted to call attention to said visual annuciator, means actuated by the movement of the vehicle for commencing the actuation of both annunciators, and means for continuing the operation of the second annunciator independently of the vehicle movement.

4. A signaling device for use on vehicles comprising a visual annunciator having thereon a legend indicating that said vehicle is being moved without authority, means adapted to be actuated by the movement of the vehicle for displaying said annunciator, an audible annunciator adapted to call attention to said visual annunciator, means for commencing the actuation of said second annunciator upon the display of said first annunciator, and means whereby the authorized operator can prevent operation of both said annunciators.

5. The combination with a vehicle of a signaling device carried thereby, said device being of an audible type, means whereby the authorized operator of the vehicle can secure said device against operation, means carried by a moving part of the vehicle adapted, upon movement of said vehicle during the time that said device is unsecured, for starting the operation of said signaling device, and also independently actuating said audible device so long as the vehicle movement continues, and additional means independent of the movement of said vehicle for continuing indefinitely the operation of said signaling device.

6. The combination with a vehicle, of a movable member carried thereby and having upon a normally concealed portion thereof a legend indicating that the vehicle is being moved without authority, a noise producing device located near said member, means whereby the authorized operator of the vehicle can secure both said member and said device against operation, and means whereby any movement of said vehicle while such member and device are unsecured will automatically expose said legend and actuate said device.

7. In a self propelled vehicle, in combination, a casing supported adjacent to the propeller shaft, a movable member adapted to project therefrom into proximity with said shaft, a noise producing device in said casing, means under the sole control of the authorized operator of the vehicle for retracting said movable member away from said shaft, a projection carried by said shaft adapted upon rotation to strike and move said member when not retracted, and means whereby the movement of said member actuates such noise producing device.

8. In a self propelled vehicle, in combination, a casing supported beneath the car body and adjacent one of the boundaries thereof, a device pivoted to said casing and having an annunciating portion adapted either to be folded into said casing or to be displayed at the side of said body and having thereon a legend indicating that the vehicle is being moved without authority, means extending from said casing into the interior of the car body whereby the authorized operator can secure said device in folded position, a movable member carried by said casing and projecting near a rotating part of the vehicle-mechanism, and a projection on said part adapted if rotated while said device is insecured to cause said annunciating portion to be displayed.

9. A signaling device for vehicles comprising a support adapted to be secured to the vehicle, a member pivoted thereto and having a portion normally concealed therein, said portion carrying a legend indicating that the vehicle has been stolen, spring-means tending to display such legend-bearing portion, a catch for holding said portion concealed, a trigger for releasing said catch, means for locking and unlocking said trigger, and means whereby movement of said vehicle while said trigger is unlocked will release said member.

10. A signaling device for vehicles comprising a casing adapted to be secured outside the vehicle body, a plate hinged thereto and having an annunciator portion, a sound producing device in said casing, a motor for actuating said device, a spring for exposing said annunciator, a catch for holding said annunciator against said spring, a slide adapted when moved to release said catch and also start said motor, means for locking said slide against movement, a trigger adapted to be moved by movement of said vehicle, and means whereby any movement of said trigger while said slide is unlocked will move the latter.

11. A signaling device for vehicles comprising a casing having therein a visual annunciator and an audible annunciator, means for actuating both of said annunciators, a trigger device for releasing both of said actuating means, said trigger adapted to be moved by operation of said vehicle, a locking device located in said casing and having a part extending into the vehicle body whereby the authorized operator can either release or secure said annunciator, and spring means in said casing adapted upon tampering with said locking device to move it automatically to releasing position.

In testimony whereof, I hereunto affix my signature.

DONALD C. MILLER.